US009399750B1

(12) United States Patent
Wiese

(10) Patent No.: US 9,399,750 B1
(45) Date of Patent: Jul. 26, 2016

(54) FORMULATION FOR CORN OIL RECOVERY AND METHOD OF USE THEREOF

(71) Applicant: Ivanhoe Industries, Inc., Mundelien, IL (US)

(72) Inventor: Robert Wiese, Mundelien, IL (US)

(73) Assignee: Ivanhoe Industries, Inc., Mudelein, IL (US)

( * ) Notice: Subject to any disclaimer, the term of this patent is extended or adjusted under 35 U.S.C. 154(b) by 0 days.

(21) Appl. No.: 14/746,431

(22) Filed: Jun. 22, 2015

(51) Int. Cl.
C11B 3/00 (2006.01)
(52) U.S. Cl.
CPC ..................................... C11B 3/006 (2013.01)
(58) Field of Classification Search
USPC ......................................................... 554/180
See application file for complete search history.

(56) References Cited

U.S. PATENT DOCUMENTS

| 2,380,166 | A | | 7/1945 | Griffin |
| 2,544,725 | A | | 3/1951 | Rider et al. |
| 3,332,486 | A | | 7/1967 | McGhee |
| 3,433,645 | A | * | 3/1969 | Egan .................. A21D 2/16 426/24 |
| 3,752,770 | A | * | 8/1973 | Buddemeyer ............ A21D 2/16 426/653 |
| 4,808,426 | A | | 2/1989 | Strop et al. |
| 4,929,361 | A | | 5/1990 | Polizzotti |
| 5,283,322 | A | | 2/1994 | Martin et al. |
| 5,408,924 | A | | 4/1995 | Arendt et al. |
| 5,932,018 | A | | 8/1999 | Palardy |
| 6,083,998 | A | | 7/2000 | Romualdo et al. |
| 7,497,955 | B2 | | 3/2009 | Scheimann et al. |
| 7,767,836 | B2 | | 8/2010 | Cheryan |
| 7,794,548 | B2 | | 9/2010 | Teeter |
| 7,893,115 | B2 | | 2/2011 | Cheng et al. |
| 8,168,037 | B2 | | 5/2012 | Winsness |
| 8,679,353 | B2 | | 3/2014 | Winsness |
| 8,747,106 | B2 | | 6/2014 | DeLine et al. |
| 8,841,469 | B2 | | 9/2014 | Shepperd et al. |
| 8,962,059 | B1 | | 2/2015 | Froderman et al. |
| 9,255,239 | B1 | | 2/2016 | Wiese |
| 2003/0008961 | A1 | * | 1/2003 | Uematsu .............. C10M 169/00 524/430 |
| 2006/0128816 | A1 | | 6/2006 | Cheng et al. |
| 2008/0176298 | A1 | | 7/2008 | Randhava et al. |
| 2010/0159547 | A1 | | 6/2010 | Faulconbridge et al. |
| 2010/0186767 | A1 | | 7/2010 | Martin |
| 2010/0331580 | A1 | | 12/2010 | Ridgley |
| 2011/0283602 | A1 | | 11/2011 | Gallop et al. |
| 2012/0125859 | A1 | | 5/2012 | Collins et al. |
| 2012/0244590 | A1 | | 9/2012 | Lee |
| 2012/0245370 | A1 | | 9/2012 | Sheppard et al. |
| 2014/0073038 | A1 | | 3/2014 | Winsness |
| 2014/0171670 | A1 | | 6/2014 | Jenkins et al. |
| 2014/0275589 | A1 | | 9/2014 | Blankenburg et al. |
| 2015/0184112 | A1 | | 7/2015 | Lewis et al. |
| 2015/0284659 | A1 | | 10/2015 | Young |

FOREIGN PATENT DOCUMENTS

| JP | 51-128912 A | 11/1976 |
| WO | WO 97/31997 A1 | 9/1997 |
| WO | WO 97/35557 A1 | 10/1997 |
| WO | WO 2007/030341 A2 | 3/2007 |
| WO | WO 2015/009485 A1 | 1/2015 |
| WO | WO 2015/057191 A1 | 4/2015 |

OTHER PUBLICATIONS

Kleiner, M., Thermal Conductivity Measurements of Thin Silicon Dioxide Films in Integrated Circuits, 1996, IEEE Transactions on the electron devices, vol. 43, No. 9, pp. 1602-1609.*
Do, Linh et al., 'Aqueous Extended-Surfactant Based Method for Vegetable Oil Extraction: Proof of Concept,' J Am Oil Chem Soc (2010) 87:1211-1220.
Kadioglu, Sezin et al., 'Surface-Based Oil Extraction of Corn Germ,' J Am Oil Chem Soc (2011) 88:863-869.
Klinkesorn, Utai et al., 'Stability and rheology of corn oil-in-water emulsions containing maltodextrin,' Food Research International 37 (2004) 851-859.
Liggett, R. et al., 'Corn Steep Liquor in Microbiology,' Bacteriol Rev (1948) vol. 12, 297-311.
P&G Professional Joy Manual Pot and Pan Detergent [95121677], 'Material Safety Data Sheet,' P&G Household Care Fabric & Home Care Innovation Center, (2009-2010) 1-5.
Wang, Hui et al., 'Effect of Low-Shear Extrusion on Corn Fermentation and Oil Partition,' J. Agric. Food Chem. 2009, 57, 2302-2307.
U.S. Appl. No. 61/454,634, filed Mar. 31, 2011, 12 pages.
Form PCT/ISA/206—Invitation to Pay Additional Fees of International Application No. PCT/US2015/068023, dated Feb. 17, 2016.

* cited by examiner

Primary Examiner — Deborah D Carr
(74) Attorney, Agent, or Firm — Leydig, Voit & Mayer

(57) ABSTRACT

Provided is a method for recovering oil from corn to ethanol production, the method comprising applying a formulation comprising (i) a compound of formula (I), in which $R^1$-$R^3$ are defined herein, (ii) an oil and/or at least one propylene glycol ester of fat and/or a fatty acid, and (iii) a metal oxide to a corn-based product from an ethanol production process. Also provided is a formulation effective for corn oil recovery comprising (i) a mixture of ethoxylated $C_{14-22}$ mono- and diglycerides, (ii) an oil and/or at least one propylene glycol ester of fat and/or a fatty acid, and (iii) a metal oxide.

19 Claims, No Drawings

FORMULATION FOR CORN OIL RECOVERY AND METHOD OF USE THEREOF

BACKGROUND OF THE INVENTION

Corn oil has gained considerable momentum for use as a biodiesel. Corn oil also is used extensively in animal (e.g., poultry, swine, and cattle) feed. Thus the ability to obtain oil as part of the ethanol recovery process from corn is more important than ever. For every bushel of corn, there is approximately 1.5 pound of corn oil available for extraction.

To obtain ethanol and oil, a corn kernel typically undergoes fractionation to separate the various parts of the kernel: endosperm, germ, and the outer skin known as bran. To produce ethanol, starch contained in the endosperm must be fermented, whereas the corn's germ contains about 85% of the kernel's oil. Corn oil typically is obtained by pressing fractionated corn particles and extracting the oil with a solvent, such as hexane. To isolate the corn oil, the solvent is evaporated, recovered, and recycled. However, this method can be undesirable with respect to the use of organic solvent and the percent oil recovery is not very high.

Thus there remains a need to improve corn processing to improve the oil yield of the process and/or avoid the use of organic solvent.

BRIEF SUMMARY OF THE INVENTION

The invention provides a method for recovering oil from corn to ethanol production by applying a formulation comprising
(i) a compound of formula (I),

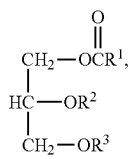

wherein
$R^1$ is a fatty acid residue,
$R^2$ and $R^3$ are the same or different and each is a polyalkoxy group or $-C(O)R^1$, provided that at least one of $R^2$ and $R^3$ is a polyalkoxy group,
(ii) an oil and/or at least one propylene glycol ester of fat and/or a fatty acid, and
(iii) a metal oxide
to a corn-based product from an ethanol production process.

The invention further provides a formulation comprising (i) a mixture of ethoxylated $C_{8-22}$ mono- and diglycerides, (ii) an oil and/or at least one propylene glycol ester of fat and/or a fatty acid, and (iii) a metal oxide.

DETAILED DESCRIPTION OF THE INVENTION

The present invention is directed to a method comprising the step of contacting a formulation to a corn-based product from the ethanol production process to improve the separation of corn oil from at least one process stream (e.g., whole stillage and/or, thin stillage and/or syrup) generated as a by-product in corn to ethanol production. The process involves extraction of oil from milled corn and residues from the fermentation step, including thick stillage, distillers wet grain, distillers dry grain and distillers dry grains, with solubles. The method can be used in either a wet milling process or a dry milling process for ethanol production. Preferably the method is employed in a dry-milling process.

In particular, the invention provides a process for extracting corn oil from corn in an ethanol production process by obtaining a corn-based product from the ethanol production process and applying a formulation comprising
(i) a compound of formula (I),

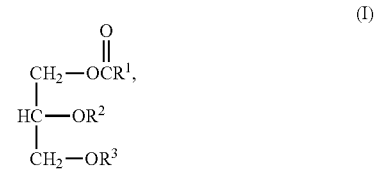

wherein
$R^1$ is a fatty acid residue,
$R^2$ and $R^3$ are the same or different and each is a polyalkoxy group or $-C(O)R^1$, provided that at least one of $R^2$ and $R^3$ is a polyalkoxy group,
(ii) an oil and/or at least one propylene glycol ester of fat and/or a fatty acid, and
(iii) a metal oxide
to the corn-based product from an ethanol production process. The applying step can take place by any suitable method, including stirring (e.g., mechanical stirring), shearing, shaking, static mixing, whisking, mashing, vibrating, circulating, flowing, boiling, spraying, or any combination thereof.

Typically the combined mixture of the corn-based product and formulation are heated during the applying step. The temperature should be sufficient to facilitate the recovery of oil from the corn-based product. For example, the mixture can be heated to 30-110° C. (e.g., 40-100° C., 50-100° C., 60-90° C., 70-90° C., 80-90° C.). In some embodiments, the mixture is heated to about 90° C., about 85° C., about 80° C., or about 75° C. Preferably, the mixture is heated to about 85° C.

The applying step can take place over any suitable time period that is appropriate for maximizing the recovery of corn oil. Typically, the applying step will be at least 1 minute (e.g., at least 2 minutes, at least 3 minutes, at least 5 minutes, at least 8 minutes, at least 10 minutes, at least 15 minutes), but generally less than 120 minutes (e.g., less than 90 minutes, less than 75 minutes, less than 60 minutes, less than 45 minutes, less than 30 minutes, less than 20 minutes, less than 15 minutes, less than 12 minutes, less than 10 minutes, less than 8 minutes, less than 5 minutes). These suggested lower and upper limits with respect to the length of time can be used in any combination to describe the range of the second temperature, or can be used singly to describe an open-ended range.

After the formulation has been applied to the corn-based product, the corn oil can be quantified, isolated, and/or purified by any suitable technique (e.g., centrifugation, physical extraction, solvent extraction, super critical fluid extraction, filtration, dissolution, fractionation, or any combination of these techniques).

The corn can be any type of corn that undergoes processing to obtain ethanol and/or oil. For example, the corn can be dent corn (also known as field corn), sweet corn, flint corn, popcorn, waxy corn (also known as maize), high oil corn, or hybrids thereof. Typically the corn will be dent corn.

In a typical dry milling process, corn oil passes through the fermentation and distillation processes and can be found in the thick (whole) stillage product, which is typically further separated into thin stillage and wet grains (wet cake) The thin stillage is processed to concentrate the composition into syrup. At this stage of the process, about half of the oil is in the distillers wet grain (DWG) and the other half is found in the syrup. The concentrated syrup can be processed to separate the oil from the syrup; the remaining syrup can be combined with the distillers wet grain (DWG) and dried to form dry distillers grain (DDG). The method can be performed at any suitable point of the ethanol production process, including after the corn has been milled (e.g., before fermentation), after thick stillage has been formed, after thin stillage has been formed, after distillers wet grains (DWG) (wet cake) have been formed, and/or after distillers dry grains with solubles (DDGS) have been formed. As it will be appreciated, the method can be performed at one point of the ethanol production process or at multiple points of the ethanol production process. Moreover, if necessary, the method can be repeated one or more times to increase the percent recovery of oil from a desired corn-based product.

In view of the flexibility of the method, the corn-based product can be in one or more forms. For example, the corn-based product can be milled corn, thick stillage, thin stillage, syrup, distillers wet grain (DWG), distillers dry grain (DDG), distillers dry grains with soluble (DDGS), or any combination thereof. In an aspect, the formulation is applied to a thick (whole) stillage, thin stillage, or syrup corn-based product. Preferably, the corn-based product is thin stillage.

The method described herein generally provides an increase in percent corn oil recovery relative to the use of no formulation. More specifically, the percent corn oil recovery is increased when the formulation is applied to the corn-based product compared to when no formulation and/or additive is applied to the same corn-based product. In some aspects, the percent corn oil recovery is at least 5% or more (e.g., at least 5.5% or more, at least 6% or more, at least 6.5% or more, at least 7% or more).

In the formulation to be applied to the corn-based product, the compound of formula (I) is an alkoxylated glycerine ester (e.g., ethoxylated mono- or diglyceride), such as alkoxylated glycerine esters derived from one or more fatty acid residues.

In the compound of formula (I), $R^1$ and optionally one of $R^2$ and $R^3$ comprise a fatty acid residue that can be saturated or unsaturated and either straight chain or branched. Fatty acids typically have an even number of carbon atoms and can range from 4 to 28 carbons. If the fatty acid residue is unsaturated, the double bond(s) can have either a cis or trans configuration. Suitable fatty acid residues include residues of butyric acid, caprylic acid, oleic acid, linoleic acid, linoeladic acid, linolenic acid, stearic acid, palmitic acid, palmitoleic acid, sapienic acid, myristic acid, myristoleic acid, lauric acid, arachidic acid, arachidonic acid, behenic acid, lignoceric acid, cerotic acid, erucic acid, elaidic acid, vaccenic acid, eicosapentaenoic acid, docosahexaenoic acid, and combinations thereof. In an embodiment, the fatty acid residue is a residue of oleic acid, lauric acid, stearic acid, palmitic acid, or a combination thereof.

In some embodiments, $R^1$ is a saturated or unsaturated, straight or branched alkyl $C_{7-22}$ chain (e.g., a $C_{8-22}$ chain, a $C_{10-20}$ chain, a $C_{12-18}$ chain, or a $C_{14-18}$ chain). In other words, $R^1$ preferably comprises at least 7 carbon atoms (e.g., at least 8 carbon atoms, at least 10 carbon atoms, at least 12 carbon atoms, at least 14 carbon atoms, at least 16 carbon atoms, at least 18 carbon atoms, or at least 20 carbon atoms) and less than 22 carbon atoms (e.g., less than 20 carbon atoms, less than 18 carbon atoms, less than 16 carbon atoms, less than 14 carbon atoms, less than 12 carbon atoms, less than 10 carbon atoms, or less than 8 carbon atoms). These suggested lower and upper limits with respect to the number of carbons in the alkyl chain of $R^1$ can be used in any combination to define a close-ended range.

$R^2$ and $R^3$ are the same or different and each is a polyalkoxy group or —C(O)$R^1$, provided that at least one of $R^2$ and $R^3$ is a polyalkoxy group. In some embodiments, both $R^2$ and $R^3$ are a polyalkoxy group. In other embodiments, one of $R^2$ and $R^3$ is —C(O)$R^1$ and the other is a polyalkoxy group. When $R^2$ and/or $R^3$ is —C(O)$R^1$, the definition of $R^1$ is the same as set forth above. While the saturated or unsaturated, straight or branched alkyl chain of $R^1$ and either $R^2$ or $R^3$ can be identical, the alkyl chains of these substituents do not necessarily need to be the same. In a preferred embodiment, the alkyl chains of $R^1$ and either $R^2$ or $R^3$ are different.

The polyalkoxy group can be based on any suitable carbon range, e.g., $C_{2-6}$, $C_{2-5}$, $C_{2-4}$, $C_{2-3}$, $C_3$, or $C_2$. For example, the polyalkoxy group can be polyethoxy (—(CH$_2$CH$_2$O)$_n$H), polypropoxy (e.g., —(CH$_2$CH(CH$_3$)O)$_n$H or —(CH(CH$_3$)CH$_2$O)$_n$H), or a combination thereof, in which n is 2-60 (e.g., n is at least 10, at least 15, at least 20, at least 25, at least 30, at least 35, at least 40, at least 45, at least 50, at least 55, or about 60 and/or n is less than 60, less than 55, less than 50, less than 45, less than 40, less than 35, less than 30, less than 25, less than 20, less than 15, less than 10, or less than 5). These suggested lower and upper limits with respect to n can be used in any combination to define a close-ended range. In an embodiment, the polyalkoxy group is a polyethoxy group comprising up to 60 moles of ethylene oxide.

The polyalkoxy group can comprise 2-60 moles alkoxylation per compound of formula (I). For example, the polyalkoxy group can comprise at least 2 moles (e.g., at least 4 moles, at least 8 moles, at least 10 moles, at least 15 moles, at least 20 moles, at least 22 moles, at least 23 moles, at least 25 moles, at least 28 moles, at least 30 moles, at least 32 moles, at least 34 moles, at least 36 moles, at least 38 moles, at least 40 moles, at least 45 moles, at least 50 moles, at least 54 moles, at least 56 moles, or at least 58 moles) and less than 60 moles (e.g., less than 58 moles, less than 56 moles, less than 54 moles, less than 50 moles, less than 45 moles, less than 40 moles, less than 38 moles, less than 36 moles, less than 34 moles, less than 32 moles, less than 30 moles, less than 28 moles, less than 25 moles, less than 23 moles, less than 22 moles, less than 20 moles, less than 15 moles, less than 10 moles, less than 8 moles, or less than 4 moles) alkoxylation per compound of formula (I). These suggested lower and upper limits with respect to the moles of alkoxylation per compound of formula (I) can be used in any combination to define a close-ended range. In some aspects, the polyalkoxy group comprises 20-25 moles (e.g., 20 moles, 21 moles, 22 moles, 23 moles, 24 moles, and 25 moles) alkoxylation (e.g., ethoxylation) per compound of formula (I).

The molecular weight of the alkoxylated portion is not particularly limited. Preferably, the molecular weight of the alkoxylated (e.g., ethoxylated) portion is set so as to provide a liquid formulation comprising (i), (ii), (iii), and any optional additives. For example, the number, weight, or volume average molecular weight can be at least about 200 g/mol (e.g., at least about 300 g/mol, at least about 400 g/mol, at least about 500 g/mol, at least about 800 g/mol, at least about 1,000 g/mol, at least about 1,500 g/mol, at least about 2,000 g/mol) and/or up to about 10,000 g/mol (e.g., up to about 9,000 g/mol, up to about 8,000 g/mol, up to about 7,000 g/mol, up to about 6,000 g/mol, up to about 5,000 g/mol, up to about 4,000 g/mol, up to about 3,000 g/mol, up to about 2,000 g/mol, or up to about 1,000 g/mol). These suggested lower and upper limits with respect to the number, weight, or volume average molecular weight can be used in any combination to describe the polymer molecular weight range (e.g., about 200 to about 10,000 g/mol, about 300 g/mol to about 5,000 g/mol, and about 1,000 to about 2,000 g/mol, etc.).

While the compound of formula (I) defines a single compound, in some aspects, the formulation will comprise more than one compound of formula (I) to form a mixture of compounds defined by formula (I). For example, the mixture of compounds defined by formula (I) can include ethoxylated $C_{8-22}$ mono- and diglycerides (e.g., $C_{4-22}$ mono- and diglycerides) or a mixture of laurate, oleate, stearate, and/or palmitate partial esters of glycerine.

The compound of formula (I) or a mixture thereof can be synthesized by any suitable method or purchased commercially. For example, a compound of formula (I) can be produced by saponifying and/or transesterifying a glyceride material, such as canola oil, cottonseed oil, corn oil, poppyseed oil, sunflower oil, safflower oil, linseed oil, peanut oil, or soybean oil. Production methods of ethoxylated monoglycerides are known in the art. See, e.g., U.S. Pat. No. 3,433,645, the entire disclosure of which is incorporated by reference.

Commercially available compounds of formula (I) or a mixture thereof include, e.g., LUMULSE™ products (Lambent Technologies, Gurnee, Ill.) and ALDOSPERSE™ products (Lonza, Allendale, NJ). Specific products include LUMULSE™ POE (20) GMS K and ALDOSPERSE™ MS-20 KFG.

The oil in the formulation is any suitable liquid oil. Typically the oil should be of a grade that is certified GRAS, however, not all instances require such grade. Suitable oils include a petroleum distillate (e.g., white mineral oil, pale oil, paraffinic oil, and combinations thereof), a vegetable oil (e.g., soybean oil, castor oil, canola oil, rapeseed oil, linseed oil, sunflower oil, safflower oil, cottonseed oil, and combinations thereof), or a combination thereof. Mineral oil (also known as white oil, liquid paraffin, pariffinum liquidum, liquid petroleum, and baby oil) is especially preferred.

The at least one propylene glycol ester of a fat and/or a fatty acid is a monoester, a diester, or a combination thereof. The propylene glycol ester can have the following structure based on 1,2-propanediol:

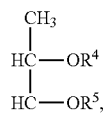

wherein $R^4$ and $R^5$ are the same or different and each is H, a fat, or a fatty acid, provided that at least one of $R^4$ and $R^5$ is a fat or fatty acid. Typically, the propylene glycol ester of a fat and/or a fatty acid is used as a mixture of at least one propylene glycol ester of a fat and at least one propylene glycol ester of a fatty acid. In addition, the propylene glycol ester of fat and/or a fatty acid can include residual monoglycerides, diglycerides, and/or glycerol in addition to the at least one propylene glycol ester of fat and/or a fatty acid.

In an aspect, the fat and/or fatty acid are edible. In an embodiment, the propylene glycol ester of fat and/or a fatty acid is of a grade described in 21 C.F.R. §172.856. Suitable fats include a vegetable oil (e.g., coconut oil, soybean oil, castor oil, canola oil, rapeseed oil, linseed oil, sunflower oil, safflower oil, cottonseed oil, and combinations thereof). The fatty acid residue can be saturated or unsaturated (e.g., either a cis or trans configuration), straight chain or branched, and have 4 to 28 carbons. Suitable fatty acid residues include residues of butyric acid, caprylic acid, oleic acid, linoleic acid, linoelaidic acid, linolenic acid, stearic acid, palmitic acid, palmitoleic acid, sapienic acid, myristic acid, myristoleic acid, lauric acid, arachidic acid, arachidonic acid, behenic acid, lignoceric acid, cerotic acid, erucic acid, elaidic acid, vaccenic acid, eicosapentaenoic acid, docosahexaenoic acid, and combinations thereof.

Examples of the at least one propylene glycol ester of a fat and/or fatty acid include propylene glycol isostearate, propylene glycol laurate, propylene glycol myristate, propylene glycol oleate, propylene glycol dicaprylate, propylene glycol dicaprylate/dicaprate, propylene glycol dicocoate, propylene glycol dipelargonate, propylene glycol oleate, propylene glycol dicaprate, propylene glycol diisostearate, and propylene glycol dilaurate.

The at least one propylene glycol ester of fat and/or a fatty acid can be prepared by any suitable method, including direct esterification of propylene glycol with a fatty acid or transesterification of propylene glycol with fat (e.g., an oil).

The metal oxide in the formulation is any compound comprising at least one metal atom and at least one anion of oxygen that has an oxidation state of −2. In some aspects, the metal oxide is selected from the group consisting of silicon dioxide (including fumed silica, amorphous silica, precipitated silica, hydrophilic silica, and hydrophobic silica), titanium dioxide, zinc oxide, iron oxide, aluminum oxide, cerium oxide, zirconium oxide, and a combination thereof. Preferably the metal oxide is silicon dioxide.

The average particle size of the metal oxide is not particularly limited and can range from 1 nm to 10 μm. For example, the average particle size of the metal oxide can be at least 1 nm (e.g., at least 10 nm, at least 30 nm, at least 50 nm, at least 75 nm, at least 100 nm, at least 200 nm, at least 300 nm, at least 400 nm, at least 500 nm, at least 600 nm, at least 700 nm, at least 800 nm, at least 900 nm, at least 1 μm, at least 2 μm, at least 3 μm, at least 4 μm, at least 5 μm, at least 6, at least 7 μm, at least 8 μm, or at least 9 μm). The average particle size of the metal oxide typically is less than 10 μm (e.g., less than 9 μm, less than 8 μm, less than 7 μm, less than 6 μm, less than 5 μm, less than 4 μm, less than 3 μm, less than 2 μm, less than 1 μm, less than 900 nm, less than 800 nm, less than 700 nm, less than 600 nm, less than 500 nm, less than 400 nm, less than 300 nm, less than 200 nm, less than 100 nm, less than 75 nm, less than 50 nm, less than 30 nm, less than 10 nm, or less than 1 nm). These suggested lower and upper limits with respect to the average particle size of the metal oxide can be used in any combination to define a close-ended range.

In some embodiments, the formulation can further comprise additional components.

For example, the formulation can optionally comprise a triglyceride that corresponds to the alkoxylated mono- or diglyceride of formula (I) (e.g., the oleate ester made from canola oil). The upper limit of the amount of triglyceride that can be present is not particularly limited, but can be up to 5 wt % (e.g., less than 4.5 wt %, less than 4 wt %, less than 3.5 wt %, less than 3 wt %, less than 2.5 wt %, less than 2 wt %, less than 1.5 wt %, less than 1 wt %, or less than 0.5 wt %).

For example, the formulation can optionally comprise glycerine in an amount up to 10 wt % (e.g., less than 9 wt %, less than 8 wt %, less than 7 wt %, less than 6 wt %, less than 5 wt %, less than 4 wt %, less than 3 wt %, less than 2 wt %, or less than 1 wt %).

The formulation can also optionally comprise one or more glycerine esters (e.g., a monoglyceride, a diglyceride, a triglyceride, or a combination thereof) in an amount up to 5 wt % (e.g., less than 4.5 wt %, less than 4 wt %, less than 3.5 wt %, less than 3 wt %, less than 2.5 wt %, less than 2 wt %, less than 1.5 wt %, less than 1 wt %, or less than 0.5 wt %). The fatty acid residues that form the glycerine ester are as described herein.

The formulation can optionally comprise a diol, such as propylene glycol or ethylene glycol, in an amount up to 7 wt % (e.g., less than 6 wt %, less than 5 wt %, less than 4 wt %, less than 3 wt %, less than 2 wt %, less than 1 wt %, or less than 0.5 wt %).

In one aspect of the invention, the formulation is substantially devoid of a component derived from a sorbitol, a sorbitan, or isosorbide. As used herein, "substantially devoid of a component derived from a sorbitol, a sorbitan, or isosorbide" refers to a formulation that contains less than about 5 wt % of a component derived from a sorbitol, a sorbitan, or isosorbide. For example, less than about 4 wt %, less than about 3 wt %, less than about 2 wt %, less than about 1 wt %, less than about 0.5 wt %, or less than about 0.1 wt % by weight of a component derived from a sorbitol, a sorbitan, or isosorbide is present in the formulation. In some embodiments, the formulation does not comprise a component derived from a sorbitol, a sorbitan, or isosorbide. In some embodiments, the formulation does not comprise a polysorbate (e.g., polysorbate 20, polysorbate 40, polysorbate 60, polysorbate 65, or polysorbate 80), a sorbitan (e.g., sorbitan monolaurate, sorbitan monooleate, or sorbitan monostearate), or sorbitol.

The formulation can comprise (i) a compound of formula (I) or a mixture thereof, (ii) an oil and/or at least one propylene glycol ester of a fat and/or a fatty acid, and (iii) a metal oxide in any amounts so long as the resulting formulation is effective for recovering corn oil from a corn-based product from an ethanol production process. The only caveat is that the amounts of compound of formula (I) or a mixture thereof, oil and/or at least one propylene glycol ester of a fat and/or a fatty acid, and metal oxide add up to 100 wt %. If the formulation includes one or more additional components, such as an alkoxylated triglyceride, glycerol, a diol, and/or one or more glycerine esters, the amounts of (i), (ii), (iii), and the one or more additional components add up to 100 wt %.

The compound of formula (I) or a mixture thereof can be present in any suitable amount. In some embodiments, the compound or mixture thereof is present in an amount of about 20-75 wt %. Thus, the compound or mixture thereof is present in an amount of at least 20 wt % (e.g., at least 25 wt %, at least about 30 wt %, at least about 35 wt %, at least about 40 wt %, at least about 45 wt %, at least about 50 wt %, at least about 55 wt %, at least about 60 wt %, at least about 65 wt %, or at least 70 wt %) and less than 75 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of a compound of formula (I) or a mixture thereof can be used in any combination to define a close-ended range. For example, the composition can comprise about 25-70 wt %, about 35-55 wt %, about 40-55 wt %, about 40-50 wt %, about 40-65 wt %, or about 50 wt % of a compound of formula (I) or a mixture thereof.

The oil or a combination of oils can be present in the composition in any suitable amount, such as about 25-74 wt %. Thus, the total amount of oil is present in an amount of at least 25 wt % (e.g., at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %) and less than 74 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of oil can be used in any combination to define a close-ended range. For example, the composition can comprise about 30-70 wt %, about 25-63 wt %, about 25-61 wt %, about 30-60 wt %, about 41-63 wt %, about 43-61 wt %, about 45-55 wt %, about 45-50 wt %, or about 46-48 wt % of an oil or a combination of oils.

The propylene glycol ester of fat and/or a fatty acid or a combination of propylene glycol ester of fats and fatty acids can be present in the composition in any suitable amount, such as about 25-74 wt %. Thus, the total amount of the propylene glycol ester of fat and/or a fatty acid is present in an amount of at least 25 wt % (e.g., at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %) and less than 74 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of the propylene glycol ester of fat and/or a fatty acid can be used in any combination to define a close-ended range. For example, the composition can comprise about 30-70 wt %, about 25-63 wt %, about 25-61 wt %, about 30-60 wt %, about 41-63 wt %, about 43-61 wt %, about 45-55 wt %, about 45-50 wt %, or about 46-48 wt % of at least one propylene glycol ester of fat and/or a fatty acid.

The metal oxide or a combination thereof can be present in the composition in any suitable amount, such as about 1-5 wt %. Thus, the total amount of metal oxide is present in an amount of at least 1 wt % (e.g., at least about 1.5 wt %, at least about 2 wt %, at least about 2.5 wt %, at least about 3 wt %, at least about 3.5 wt %, at least about 4 wt %, or at least about 4.5 wt %) and less than 5 wt % (e.g., less than about 4.5 wt %, less than about 4 wt %, less than about 3.5 wt %, less than about 3 wt %, less than about 2.5 wt %, less than about 2 wt %, less than about 1.5 wt %, or less than about 1 wt %). These suggested lower and upper limits with respect to the amount of metal oxide can be used in any combination to define a close-ended range. For example, the composition can comprise about 2-4 wt %, 2-3 wt %, about 2 wt %, or about 3 wt % of metal oxide or a combination thereof.

The present invention is directed to a formulation comprising (i) a mixture of compounds defined by formula (I) comprising ethoxylated $C_{8-22}$ mono- and diglycerides, (ii) an oil and/or at least one propylene glycol ester of fat and/or a fatty acid, and (iii) a metal oxide. The oil, propylene glycol ester of fat and/or a fatty acid, and metal oxide are as described herein. In an aspect, this formulation comprises:
50 wt % of (i), 46-48 wt % of (ii), and 2-4 wt % of (iii),
63 wt % of (i), 35 wt % of (ii), and 2 wt % of (iii),
55 wt % of (i), 43 wt % of (ii), and 2 wt % of (iii),
54 wt % of (i), 43 wt % of (ii), and 3 wt % of (iii),
55 wt % of (i), 43 wt % of (ii), and 2 wt % of (iii),
50 wt % of (i), 48 wt % of (ii), and 2 wt % of (iii),
50 wt % of (i), 47 wt % of (ii), and 3 wt % of (iii)
40 wt % of (i), 58 wt % of (ii), and 2 wt % of (iii), or
40 wt % of (i), 57 wt % of (ii), and 3 wt % of (iii).

In any of the embodiments of this formulation, the oil can be mineral oil or the metal oxide can be silicon dioxide or a combination of both features.

The formulations described herein can be prepared by any suitable method. In general, the metal oxide (e.g., silicon dioxide) is pre-mixed in a portion of the oil (e.g., mineral oil) and/or at least one propylene glycol ester of fat and/or a fatty acid. The compound of formula (I) or a mixture thereof is then blended with the metal oxide/oil (or propylene glycol ester) premix, and the remaining portion of oil (or propylene glycol ester). The resulting composition is mixed well, optionally heated (e.g., up to 150° C., up to 130° C., up to 120° C., up to 110° C., up to 100° C., etc.), processed through a homogenizer to provide a uniform (or nearly uniform) particle size, and filtered.

In a preferred embodiment, the formulation is a liquid at room temperature. Accordingly, in such embodiments, the formulation should not be a gel, solid, or semi-solid at room temperature.

The following examples further illustrate the invention but, of course, should not be construed as in any way limiting its scope.

Example 1

This example demonstrates a method of corn oil recovery from a corn-based product using an ethanol production process in an embodiment of the invention.

On an analytical balance, 0.05 to 0.07 g of a formulation ("defoamer") (0.05 wt % of the total sample) was weighed into a 250 ml beaker. The appropriate amount of corn syrup was added, which ranged from 100 g for 0.05 g of defoamer to 140 g for 0.07 g of defoamer. A stir bar was added, and the defoamer/corn syrup mixture was placed on a hot plate. The mixture was agitated sufficiently to form a vortex, heated to 85° C., and held at that temperature for 5 minutes.

After heating for 5 minutes, the beaker was removed and the contents were poured into a small centrifuge tube with the defoamer/corn oil syrup mixture to about the top of the tube. The tube was not overfilled, so that the top of the sample was viewable in the centrifuge tube when the cap of the centrifuge tube is on. The tube was centrifuged for 10 minutes.

After 10 minutes, the tube was removed from the centrifuge and the contents were left undisturbed for 1 hour.

The total height (mm) of the sample (corn oil portion and the rest of the sample) and the total height (mm) of just the corn oil portion of the sample were measured and recorded. The corn oil portion was measured as a height (mm) and as a % recovery. The results are set forth in the following Tables 1-13.

TABLE 1

| Corn Oil Sample 4490 | Blank | Blank | CEA2 8330 | CEA5 8331 | CEA 7 8332 |
|---|---|---|---|---|---|
| Polysorbate 80 | | | | 40 | 43.5 |
| Canola Oil | | | 34 | | |
| Hydrophobic Silica | | | 6 | 6 | 6.5 |
| Ethoxylated mono & diglycerides | | | 45 | 45 | 45 |
| Ethoxylated stearic acid | | | | | 4 |
| Polysorbate 65 | | | 5 | | |
| Mono & diglycerides, liquid, low mono | | | 5 | 5 | 5 |
| Propylene Glycol | | | 5 | | |
| Centrifuge, Large | | | | | |
| Amount Defoamer | 0 | 0 | 0.0632 | 0.068 | 0.0548 |
| Amount Corn Syrup | 125 | 120 | 126.4 | 136 | 109.6 |
| Total Height (mm) | 92 | 97 | 98 | 100 | 102 |
| Height Corn Oil (mm) | 2 | 4 | 6 | 7 | 7 |
| % Corn Oil | 2.51 | 4.12 | 6.12 | 7 | 6.86 |
| Centrifuge, Small | | | | | |
| Total Height (mm) | 108 | 105 | 107 | 106 | 108 |
| Height Corn Oil (mm) | 2 | 3 | 6 | 6 | 6.5 |
| % Corn Oil | 1.85 | 2.86 | 5.61 | 5.66 | 6.02 |

TABLE 2

| Corn Oil Sample 4813 | Blank | 9493 R4 | 9493 R5 | 9493 R6 | 9494 R7 | 9494 R8 | 9494 R9 | 9493 R4 | 9493 R5 | 9493 R6 | 9494 R7 | 9494 R8 |
|---|---|---|---|---|---|---|---|---|---|---|---|---|
| Canola Oil | | | | | 29.8 | 29.8 | | | | | 29.8 | 29.8 |
| White mineral Oil | | | | | | | | | | | | |
| Technical White Oil | | | | | | | | | | | | |
| Hydrophobic Silica | | 3.5 | 3.5 | 3.5 | 5.2 | 5.2 | 3.5 | 3.5 | 3.5 | 3.5 | 5.2 | 5.2 |
| Ethoxylated mono & diglycerides | | 5 | 5 | 5 | 5 | 30 | 55 | 5 | 5 | 5 | 5 | 30 |
| Silicon Dioxide | | | | | | | | | | | | |
| Mono & diglycerides, liquid, low mono | | 5 | 5 | 5 | 5 | 5 | 5 | 5 | 5 | 5 | 5 | 5 |
| Polyglycerol oleate | | 25 | | 25 | 25 | | | 25 | | 25 | 25 | |
| Decaglycerol decaoleate | | | | | | | | | | | | |
| Polyglycerol oleate transester | | 56.5 | 81.5 | 56.5 | 25 | 25 | 31.5 | 56.5 | 81.5 | 56.5 | 25 | 25 |
| Propylene Glycol | | 5 | 5 | 5 | 5 | 5 | 5 | 5 | 5 | 5 | 5 | 5 |
| Sorbitol, 70% or 80% | | | | | | | | | | | | |
| Sorbitan monolaurate | | | | | | | | | | | | |
| Glycerine | | | | | | | | | | | | |
| Ethoxylated Stearic Acid | | | | | | | | | | | | |
| Amount Defoamer | 0 | 0.0696 | 0.0632 | 0.0704 | 0.0565 | 0.0613 | 0.0596 | 0.0675 | 0.0599 | 0.0605 | 0.0657 | 0.0597 |
| Amount Corn Syrup | 130 | 139.2 | 126.4 | 140.8 | 113 | 122.6 | 119.2 | 135 | 119.8 | 121 | 131.4 | 119.4 |
| Centrifuge, Small | | | | | | | | | | | | |
| Total Height (mm) | 106 | 106 | 107 | 107 | 107 | 108 | 107 | 105 | 105 | 106 | 108 | 108 |
| Height Corn Oil (mm) | 5 | 6 | 7 | 7 | 7.5 | 7.5 | 7 | 7 | 7 | 7 | 7.5 | 7 |
| % Corn Oil | 4.72 | 5.66 | 6.54 | 6.54 | 7.01 | 6.94 | 6.54 | 6.67 | 6.67 | 6.6 | 6.94 | 648 |

TABLE 3

| Corn Oil Sample 4813 | 9494 R9 | Blank | 9618 R1 | 9618 R3 | 9577 R1 | 9577 R2 | 9577 R3 | 9577 R4 | 9578 R5 | 9578 R6 | 9578 R7 | 9578 R8 |
|---|---|---|---|---|---|---|---|---|---|---|---|---|
| Canola Oil | | | | | | | | | | | | |
| White mineral Oil | | | | | 50 | | 40 | 40 | 30 | 27 | 27 | |
| Technical White Oil | | | | | | 50 | | | | | | 30 |
| Hydrophobic Silica | 3.5 | | | | | | 13 | | | 13 | | |
| Ethoxylated mono & diglycerides | 55 | | 100 | 50 | 50 | 50 | 47 | 47 | 30 | 30 | 30 | 30 |
| Silicon Dioxide | | | | | | | 13 | | | 13 | | |
| Mono & diglycerides, liquid, low mono | 5 | | | | | | | | 10 | 10 | 10 | 10 |
| Polyglycerol oleate | | | | | | | | | | | | |
| Decaglycerol decaoleate | | | | | | | | | | | | |
| Polyglycerol oleate transester | 31.5 | | | 50 | | | | | 30 | 20 | 20 | 30 |
| Propylene Glycol | 5 | | | | | | | | | | | |
| Sorbitol, 70% or 80% | | | | | | | | | | | | |
| Sorbitan monolaurate | | | | | | | | | | | | |
| Glycerine | | | | | | | | | | | | |
| Ethoxylated Stearic Acid | | | | | | | | | | | | |
| Amount Defoamer | 0.0809 | 0 | 0.0614 | 0.0656 | 0.077 | 0.0646 | 0.0595 | 0.0832 | 0.0726 | 0.0697 | 0.0693 | 0.0546 |
| Amount Corn Syrup | 161.8 | 130 | 122.8 | 131.2 | 154 | 129.2 | 119 | 166.4 | 145.2 | 139.4 | 138.6 | 109.2 |
| Centrifuge, Small | | | | | | | | | | | | |
| Total Height (mm) | 107 | 107 | 107 | 103 | 105 | 106 | 106 | 103 | 104 | 106 | 104 | 105 |
| Height Corn Oil (mm) | 7 | 4 | 4 | 4.5 | 4 | 5 | 7 | 6.5 | 6 | 6.5 | 7 | 6 |
| % Corn Oil | 6.54 | 3.74 | 3.74 | 4.37 | 3.81 | 4.72 | 6.6 | 6.31 | 5.77 | 6.13 | 6.73 | 5.71 |

TABLE 4

| Corn Oil Sample 4813 | 9579 R10 | 9577 R3 | 9577 R4 | 9578 R6 | 9578 R7 | R11 | R12 | 9630 R16 | 9630 R18 | 9581 R20 | 9631 R22 | 9631 R24 |
|---|---|---|---|---|---|---|---|---|---|---|---|---|
| Canola Oil | | | | | | | | | | | | |
| While mineral Oil | | 40 | 40 | 27 | 27 | | | | | 32.8 | | |
| Technical White Oil | | | | | | 27 | 27 | | 30 | | | 32.2 |
| Hydrophobic Silica | | 13 | | 13 | | | | | | 7.2 | | |
| Ethoxylated mono & diglycerides | 25 | 47 | 47 | 30 | 30 | 20 | 20 | 87 | 57 | 20 | 93.5 | 61.3 |
| Silicon Dioxide | | | 13 | | 13 | 13 | 13 | 13 | 13 | | 6.5 | 6.5 |
| Mono & diglycerides, liquid, low mono | 5 | | | 10 | 10 | 10 | 10 | | | | | |
| Polyglycerol oleate | | | | | | | | | | | | |
| Decaglycerol decaoleate | | | | | | | | | | | | |
| Polyglycerol oleale transester | | | | 20 | 20 | 30 | | | | | | |
| Propylene Glycol | | | | | | | 10 | | | 5 | | |
| Sorbitol, 70% or 80% | 40 | | | | | | | | | 35 | | |
| Sorbitan monolaurate | 25 | | | | | | 20 | | | | | |
| Glycerine | 5 | | | | | | | | | | | |
| Ethoxylated Stearic Acid | | | | | | | | | | | | |
| Amount Defoamer | 0.0599 | 0.0731 | 0.065 | 0.06 | 0.061 | 0.0725 | 0.0746 | 0.078 | 0.0698 | 0.0563 | 0.0586 | 0.0585 |
| Amount Corn Syrup | 119.8 | 146.2 | 130 | 120 | 122 | 145 | 149.2 | 156 | 139.6 | 112.6 | 117.2 | 117 |
| Centrifuge, Small | | | | | | | | | | | | |
| Height (mm) | 105 | 105 | 103 | 105 | 105 | 103 | 105 | 104 | 103 | 104 | 105 | 105 |
| Height Corn Oil (mm) | 6 | 7 | 7 | 7 | 7 | 6 | 7 | 7 | 6 | 7 | 7 | 6.5 |
| % Corn Oil | 5.71 | 6.67 | 6.8 | 6.67 | 6.67 | 5.83 | 6.67 | 6.73 | 5.83 | 6.73 | 6.67 | 6.19 |

TABLE 5

| Corn Oil Sample 4813 | Blank | 9632 R26 | 9632 R28 | 9631 R22 | 9631 R24 | 9585 R29 | 9585 R30 | 9633 R31 | 9633 R32 | 9633 R31 | 9633 R32 | 9639 R39 |
|---|---|---|---|---|---|---|---|---|---|---|---|---|
| Canola Oil | | | | | | | | | | | | |
| White mineral Oil | | | | | | | | | | | | |
| Technical White Oil | | | 33 | | 32.2 | 35 | 35 | | 35 | | 35 | |
| Hydrophobic Silica | | | | | | | | | | | | |
| Ethoxylated mono & diglycerides | | 96 | 63 | 93.5 | 61.3 | 25 | 17 | 98 | 63 | 98 | 63 | 98 |
| Silicon Dioxide | | 4 | 4 | 6.5 | 6.5 | 3 | 3 | 2 | 2 | 2 | 2 | 2 |
| Mono & diglycerides, liquid, low mono | | | | | | 10 | 10 | | | | | |
| Polyglycerol oleate | | | | | | | | | | | | |
| Decaglycerol decaoleate | | | | | | | | | | | | |
| Polyglycerol oleate transester | | | | | | | | | | | | |
| Propylene Glycol | | | | | | | | | | | | |

TABLE 5-continued

| Corn Oil Sample 4813 | Blank | 9632 R26 | 9632 R28 | 9631 R22 | 9631 R24 | 9585 R29 | 9585 R30 | 9633 R31 | 9633 R32 | 9633 R31 | 9633 R32 | 9639 R39 |
|---|---|---|---|---|---|---|---|---|---|---|---|---|
| Sorbitol, 70% or 80% | | | | | | | 25 | | | | | |
| Sorbitan monolaurate | | | | | | 17 | | | | | | |
| Glycerine | | | | | | | | | | | | |
| Ethoxylated Stearic Acid | | | | | | 10 | 10 | | | | | |
| Amount Defoamer | 0 | 0.0544 | 0.0596 | 0.0587 | 0.0618 | 0.0762 | 0.079 | 0.0601 | 0.0667 | 0.0625 | 0.0734 | 0.0603 |
| Amount Corn Syrup | 120 | 108.8 | 119.2 | 117.4 | 123.6 | 152.4 | 158 | 120.2 | 123.4 | 125 | 146.8 | 120.6 |
| Centrifuge, Small | | | | | | | | | | | | |
| Total Height (mm) | 105 | 105 | 106 | 106 | 105 | 104 | 106 | 105 | 106 | 107 | 106 | 107 |
| Height Corn Oil (mm) | 4.5 | 7 | 7 | 7 | 7 | 6 | 6 | 7 | 7 | 7 | 6.5 | 7 |
| % Corn Oil | 4.29 | 6.67 | 6.6 | 6.6 | 6.67 | 5.77 | 5.66 | 6.67 | 6.6 | 6.54 | 6.13 | 6.54 |

TABLE 6

| Corn Oil Sample 4813 | 9639 R40 | 9639 R41 | 9639 R42 | 9639 R43 | 9639 R44 | 9639 R45 | 9639 R46 | 9642 R47 | 9642 R48 | 9642 R49 | 9642 R50 | 9642 R51 |
|---|---|---|---|---|---|---|---|---|---|---|---|---|
| Canola Oil | | | | | | | | | | | | |
| White mineral Oil | | | | 43 | 43 | | | 58 | 57 | 53 | 52 | 43 |
| Technical White Oil | 35 | 43 | 43 | | | 48 | 47 | | | | | |
| Hydrophobic Silica | | | | | | | | | | | | |
| Ethoxylated mono & diglycerides | 63 | 55 | 54 | 55 | 54 | 50 | 50 | 40 | 40 | 45 | 45 | 55 |
| Silicon Dioxide | 2 | 2 | 3 | 2 | 3 | 2 | 3 | 2 | 3 | 2 | 3 | 2 |
| Mono & diglycerides, liquid low mono | | | | | | | | | | | | |
| Polyglycerol oleate | | | | | | | | | | | | |
| Decaglycerol decaoleate | | | | | | | | | | | | |
| Polyglycerol oleate transester | | | | | | | | | | | | |
| Propylene Glycol | | | | | | | | | | | | |
| Sorbitol, 70% or 80% | | | | | | | | | | | | |
| Sorbitan monolaurate | | | | | | | | | | | | |
| Glycerine | | | | | | | | | | | | |
| Ethoxylated Stearic Acid | | | | | | | | | | | | |
| Amount Defoamer | 0.0756 | 0.055 | 0.0543 | 0.0547 | 0.0566 | 0.0574 | 0.057 | 0.0649 | 0.094 | 0.0714 | 0.0747 | 0.0575 |
| Amount Corn Syrup | 141.2 | 110 | 108.6 | 109.4 | 113.2 | 114.8 | 114 | 129.8 | 128.8 | 142.8 | 149.4 | 115 |
| Centrifuge, Small | | | | | | | | | | | | |
| Total Height (mm) | 107 | 108 | 107 | 108 | 106 | 107 | 107 | 107 | 107 | 106 | 107 | 105 |
| Height Corn Oil (mm) | 6 | 7 | 7 | 7 | 7 | 7 | 7 | 7 | 7 | 7 | 7 | 6 |
| % Corn Oil | 5.6 | 6.48 | 6.54 | 6.48 | 6.6 | 6.54 | 6.54 | 6.54 | 6.54 | 6.6 | 6.54 | 5.71 |

TABLE 7

| Corn Oil Sample 4813 | 9642 R52 | 9651 R53 | 9651 R54 | 9652 R55 | 9652 R56 | 9652 R57 | 9652 R58 | 9652 R59 | 9652 R60 | 9654 R61 | 9654 R62 | 9654 R63 |
|---|---|---|---|---|---|---|---|---|---|---|---|---|
| Canola Oil | | | | | | | | | | | | |
| White mineral Oil | 42 | 40 | 40 | 47.5 | 42.8 | 47.5 | 46.35 | 45.1 | 42.8 | 47 | 46.5 | 46 |
| Technical White Oil | | | | | | | | | | | | |
| Hydrophobic Silica | | | | 2.5 | 2.2 | 2.5 | 2.4 | 2.4 | 2.2 | | | |
| Ethoxylated mono & diglycerides | 55 | 55 | 55 | 50 | 55 | 50 | 48.75 | 47.5 | 45 | 50 | 50 | 50 |
| Silicon Dioxide | 3 | | | | | | | | | 3 | 3.5 | 4 |
| Mono & diglycerides, liquid, low mono | | | | | | | | | | | | |
| Polyglycerol oleate | | | 5 | | | | | | | | | |
| Decaglycerol decaoleate | | 5 | | | | | | | | | | |
| Polyglycerol oleate transester | | | | | | | | | | | | |
| Propylene Glycol | | | | | | | | | | | | |
| Sorbitol, 70% or 80% | | | | | | | | 2.5 | | | | |
| Sorbitan monolaurate | | | | | | | | | | | | |
| Glycerine | | | | | | | | 5 | 10 | | | |
| Ethoxylated Stearic Acid | | | | | | | | | | | | |
| Amount Defoamer | 0.0549 | 0.0729 | 0.0505 | 0.0606 | 0.0623 | | 0.0613 | | 0.0539 | 0.0588 | 0.0762 | |
| Amount Corn Syrup | 119.8 | 145.8 | 101 | 121.2 | 124.6 | | 122.6 | | 107.8 | 117.6 | 152.4 | |
| Centrifuge, Small | | | | | | | | | | | | |
| Total Height (mm) | 107 | 106 | 106 | 107 | 107 | | 108 | | 107 | 107 | 106 | |
| Height Corn Oil (mm) | 7 | 7 | 7 | 7 | 7 | | 7 | | 7 | 7 | 7 | |
| % Corn Oil | 6.54 | 6.6 | 6.6 | 6.54 | 6.54 | | 6.48 | | 6.54 | 6.54 | 6.6 | |

TABLE 8

| Corn Oil Sample 4559 | Blank | CE2 8330 | CE5 8331 | CE7 8332 | CE20 8278 | CE24 8280 | CE25 8280 | CE26 8280 | Blank | Blank |
|---|---|---|---|---|---|---|---|---|---|---|
| Polysorbate 80 | | | 40 | 43.5 | 56 | | | | | |
| Canola Oil | | 34 | | | | 29.8 | 29.8 | 29.8 | | |
| Hydrophobic Silica | | 6 | 6 | 6.5 | 5.2 | 5.2 | 5.2 | 5.2 | | |
| Polyglycerol oleate | | | | | | | | | | |
| Polyglycerol oleate, transester | | | | | | | | | | |
| Ethoxylated mono & diglycerides | | 45 | 45 | 45 | 2.5 | 52 | 54 | 52 | | |
| Ethoxylated stearic acid | | | 4 | | 1.5 | 3 | 2 | 3 | | |
| Polysorbate 65 | | 5 | | | | | | | | |
| Mono & diglycerides, liquid | | 5 | 5 | 5 | | | | | | |
| Mono & diglycerides, liquid, low mono | | | | | | | | 4 | | |
| Propylene Glycol | | 5 | | | | | | | | |
| Glycerine | | | | | 5 | 5 | 5 | | | |
| Oleic Acid | | | | | | 5 | | 5 | | |
| Soya lecithin | | | | | | | | 5 | | |
| Centrifuge, Large | | | | | | | | | | |
| Amount Defoamer | n/a | 0.0622 | 0.0701 | 0.0575 | 0.0853 | 0.0629 | 0.067 | 0.0672 | n/a | n/a |
| Amount Corn Syrup | 120 | 124.4 | 140.2 | 115 | 170.6 | 125.8 | 134 | 134.4 | 125 | 122 |
| Total Height (mm) | 101 | 99 | 99 | 99 | 101 | 98 | 98 | 98 | 99 | 99 |
| Height Corn Oil (mm) | 4 | 6.5 | 7 | 7 | 7 | 6 | 6.5 | 6 | 2.5 | 4 |
| % Corn Oil | 3.96 | 6.57 | 7.07 | 7.07 | 6.93 | 6.12 | 6.63 | 6.12 | 2.53 | 4.04 |
| Centrifuge, Small | | | | | | | | | | |
| Total Height (mm) | 109 | 107 | 106 | 109 | 108 | 107 | 107 | 106 | 107 | 107 |
| Height Corn Oil (mm) | 4 | 7 | 6 | 7 | 6.5 | 7 | 6 | 6.5 | 3 | 4 |
| % Corn Oil | 3.67 | 6.54 | 5.66 | 6.42 | 6.02 | 6.54 | 5.61 | 6.13 | 2.8 | 3.73 |

TABLE 9

| Corn Oil Sample 4559 | A33 unmilled 8369 | A33 milled 8369 | A34 unmilled 8369 | A34 milled 8369 | A35 unmilled 8370 | A35 milled 8370 | A36 unmilled 8370 | A36 milled 8370 | A21 unmilled 8358 | A21 milled 8358 |
|---|---|---|---|---|---|---|---|---|---|---|
| Polysorbate 80 | | | | | | | | | | |
| Canola Oil | 29.8 | 29.8 | 29.8 | 29.8 | | | 29.8 | 29.8 | | |
| Hydrophobic Silica | 5.2 | 5.2 | 5.2 | 5.2 | 3.5 | 3.5 | 5.2 | 5.2 | 5.2 | 5.2 |
| Polyglycerol oleate | | | 25 | 25 | | | | | | |
| Polyglycerol oleate, transester | 25 | 25 | | | 56.5 | 56.5 | 25 | 25 | 54.8 | 54.8 |
| Ethoxylated mono & diglycerides | 25 | 25 | 25 | 25 | 25 | 25 | 25 | 25 | 25 | 25 |
| Ethoxylated stearic acid | | | | | | | | | | |
| Polysorbate 65 | 5 | 5 | 5 | 5 | 5 | 5 | 5 | 5 | 5 | 5 |
| Mono & diglycerides, liquid | | | | | | | | | | |
| Mono & diglycerides, liquid, low mono | 5 | 5 | 5 | 5 | 5 | 5 | 5 | 5 | 5 | 5 |
| Propylene Glycol | | | | | | | | | 5 | 5 |
| Glycerine | 5 | 5 | 5 | 5 | 5 | 5 | 5 | 5 | | |
| Oleic Acid | | | | | | | | | | |
| Soya lecithin | | | | | | | | | | |
| Centrifuge, Large | | | | | | | | | | |
| Amount Defoamer | 0.0571 | 0.0633 | 0.0663 | 0.0602 | 0.0604 | 0.0717 | 0.057 | 0.0679 | 0.0602 | 0.0706 |
| Amount Corn Syrup | 114.2 | 126.6 | 132.6 | 120.4 | 120.8 | 143.4 | 114 | 135.8 | 120.4 | 141.2 |
| Total Height (mm) | 99 | 100 | 100 | 99 | 100 | 103 | 103 | 104 | 98 | 97 |
| Height Corn Oil (mm) | 6.5 | 6 | 6 | 6 | 6.5 | 6.5 | 6.5 | 6 | 6 | 6 |
| % Corn Oil | 6.57 | 6 | 6 | 6.06 | 5.96 | 6.31 | 6.31 | 5.77 | 6.12 | 6.19 |
| Centrifuge, Small | | | | | | | | | | |
| Total Height (mm) | 108 | 108 | 109 | 107 | 109 | 107 | 109 | 106 | 105 | 105 |
| Height Corn Oil (mm) | 6 | 6 | 6.5 | 6 | 6.5 | 6 | 6.5 | 6 | 6 | 6 |
| % Corn Oil | 5.55 | 5.55 | 5.96 | 5.61 | 5.96 | 5.61 | 5.96 | 5.66 | 5.71 | 5.71 |

TABLE 10

| Corn Oil Sample 4559 | A22 unmilled 8358 | A22 milled 8358 | A23 unmilled 8358 | A23 milled 8358 | A33 8380 | A34 8380 | A40 8382 | A47 8619 |
|---|---|---|---|---|---|---|---|---|
| Polysorbate 80 | | | | | 65.4 | 60.4 | | 39.1 |
| Canola Oil | | | | | | | 29.8 | |
| Hydrophobic Silica | 3.5 | 3.5 | 5.2 | 5.2 | 4.6 | 4.6 | 5.2 | 5.9 |
| Polyglycerol oleate | | | | | | | 30 | |
| Polyglycerol oleate, transester | 31.5 | 31.5 | 29.8 | 29.8 | | | 20 | |
| Ethoxylated mono & diglycerides | 50 | 50 | 45 | 45 | 15 | 20 | 20 | 20 |
| Ethoxylated stearic acid | | | | | | | | |
| Polysorbate 65 | 5 | 5 | 5 | 5 | 5 | 5 | 5 | 5 |
| Mono & diglycerides, liquid | | | | | | | | |
| Mono & diglycerides, liquid, low mono | 5 | 5 | 5 | 5 | 5 | 5 | 5 | 5 |

TABLE 10-continued

| Corn Oil Sample 4559 | A22 unmilled 8358 | A22 milled 8358 | A23 unmilled 8358 | A23 milled 8358 | A33 8380 | A34 8380 | A40 8382 | A47 8619 |
|---|---|---|---|---|---|---|---|---|
| Propylene Glycol | 5 | 5 | | | | | | 5 |
| Glycerine | | | 10 | 10 | 5 | 5 | 5 | |
| Oleic Acid | | | | | | | | |
| Soya lecithin | | | | | | | | |
| Centrifuge, Large | | | | | | | | |
| Amount Defoamer | 0.0744 | 0.0578 | 0.0604 | 0.0631 | 0.0777 | 0.0706 | 0.0756 | 0.0599 |
| Amount Corn Syrup | 148.8 | 115.6 | 120.8 | 126.2 | 155.4 | 141.2 | 151.2 | 119.8 |
| Total Height (mm) | 98 | 96 | 98 | 96 | 99 | 98 | 99 | 98 |
| Height Corn Oil (mm) | 6.5 | 5.5 | 6 | 6 | 6 | 6.5 | 7 | 6.5 |
| % Corn Oil | 6.63 | 5.73 | 6.12 | 6.25 | 6.06 | 6.63 | 7.07 | 6.32 |
| Centrifuge, Small | | | | | | | | |
| Total Height (mm) | 106 | 106 | 108 | 107 | 106 | 106 | 106 | 107 |
| Height Corn Oil (mm) | 6 | 5 | 5 | 5 | 6.5 | 6.5 | 6.5 | 7 |
| % Corn Oil | 5.66 | 4.71 | 4.63 | 4.67 | 6.13 | 6.13 | 6.13 | 6.54 |

TABLE 11

| Corn Oil Sample LL4885 | 9684 R88 1/14/15 | 9685 R93 1/15/15 | 9688A 1/20/15 | 9688C 1/20/15 | 9688D 1/20/15 |
|---|---|---|---|---|---|
| Ethoxylated mono & diglycerides | 50 | 55 | 49.5 | 50.6 | 52 |
| Hydrophilic silica | 3 | 3 | 3 | 2.9 | 2.9 |
| Mono & diglycerides, solid | 2.5 | | | | |
| Water | 5 | 2 | 1 | 1 | 2 |
| White Mineral Oil | 39.5 | 40 | 46.5 | 45.5 | 43.1 |
| Amount Defoamer | 0.0569 | 0.0593 | 0.0619 | 0.0632 | 0.0602 |
| Amount Corn Syrup | 113.8 | 118.6 | 123.8 | 126.4 | 120.4 |
| Total Height (mm) | 107 | 106 | 105 | 106 | 106 |
| Height Corn Oil (mm) | 6.5 | 6.5 | 6.5 | 6.5 | 6.5 |
| % Corn Oil | 6.07 | 6.13 | 6.19 | 6.13 | 6.13 |

TABLE 12

| Corn Oil Sample LL4967 | Polysorbate 80 | 9903 | 9920/5 | 9925/5 | 9927/4 | 9929/1 | 9929/2 | 9929/3 | 9929/4 | 9929/5 |
|---|---|---|---|---|---|---|---|---|---|---|
| Polysorbate 80 | 100 | 88.5 | | | | | | | | |
| Mono & diglycerides, low mono | | 5 | | | | | | | | |
| Polyglycerol oleate | | | | | | | | 10 | | |
| Oleic Acid | | | | | | | | | 5 | |
| Ethoxylated mono & diglycerides | | | 55 | 55 | 55 | 55 | 55 | 50 | 50 | 50 |
| Silicon dioxide, hydrophobic | | 6.5 | 6.75 | 5.25 | 6.75 | 5.25 | 6.75 | 6 | 5.25 | 6 |
| Propylene glycol ester of fats and fatty acids | | | 38.25 | 29.75 | 38.25 | 29.75 | 38.25 | 34 | 29.75 | 34 |
| Propylene Glycol | | | | 10 | | 10 | | | 10 | 10 |
| Amount Defoamer | 0.0701 | 0.0683 | 0.0618 | 0.0600 | 0.0632 | 0.0673 | 0.0653 | 0.0648 | 0.0700 | 0.0651 |
| Amount Corn Syrup | 140.2 | 136.6 | 123.6 | 120.0 | 126.4 | 134.6 | 130.6 | 129.6 | 140.0 | 130.2 |
| Height Corn Oil (mm) | 4.5 | 6.0 | 5.5 | 6.0 | 6.0 | 6.0 | 5.5 | 5.0 | 6.0 | 5.0 |
| % Oil Recovery | 4.28 | 5.5 | 5.19 | 5.55 | 5.55 | 5.66 | 5.24 | 4.72 | 5.61 | 4.63 |

TABLE 13

| Corn Oil Sample LL4967 | Polysorbate 80 | 9951/1 | 9951/2 | 9950/1 | 9950/2 |
|---|---|---|---|---|---|
| Polysorbate 80 | 100 | 88.5 | | | |
| Mono & diglycerides, low mono | | 5 | 5 | | |
| Polyglycerol oleate | | | | | |
| Oleic Acid | | | | 5 | 5 |
| Ethoxylated mono & diglycerides | | | 88.5 | 50 | 50 |
| Vegetable oil | | | | 29.75 | |
| Silicon dioxide, hydrophobic | | 6.5 | 6.5 | 5.25 | 5.25 |
| Propylene glycol ester of fats and fatty acids | | | | | 29.75 |
| Propylene Glycol | | | | 10 | 10 |
| Amount Defoamer | 0.0700 | 0.0680 | 0.0710 | 0.0688 | 0.0599 |
| Amount Corn Syrup | 140.0 | 136.0 | 142.0 | 137.6 | 119.8 |
| Total Height (mm) | 104 | 104 | 106 | 106 | 104 |
| Height Corn Oil (mm) | 5.0 | 6.5 | 6.0 | 6.0 | 6.0 |
| % Oil Recovery | 4.81 | 6.25 | 5.66 | 5.66 | 5.76 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar references in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for recovering oil from corn in ethanol production, the method comprising applying a formulation comprising
   (i) a compound of formula (I),

wherein
   $R^1$ is a fatty acid residue;
   $R^2$ and $R^3$ are the same or different and each is a polyalkoxy group or $-C(O)R^1$, provided that at least one of $R^2$ and $R^3$ is a polyalkoxy group
   (ii) at least one propylene glycol ester of fat and/or a fatty acid, and
   (iii) a metal oxide
   to a corn-based product from an ethanol production process.

2. The method of claim 1, wherein the corn-based product is milled corn, thick stillage, thin stillage, syrup, distillers wet grain (DWG), distillers dry grain (DDG), distillers dry grains with soluble (DDGS), or any combination thereof.

3. The method of claim 1, wherein the applying step is performed after the corn has been milled, after thick stillage has been formed, after thin stillage has been formed, after distillers wet grains (DWG) have been formed, and/or after distillers dry grains with solubles (DDGS) have been formed.

4. The method of claim 1, wherein $R^1$ is a saturated or unsaturated, straight or branched alkyl $C_{7-22}$ chain.

5. The method of claim 1, wherein $R^1$ is a saturated or unsaturated, straight or branched alkyl $C_{8-22}$ chain.

6. The method of claim 1, wherein both $R^2$ and $R^3$ are a polyalkoxy group.

7. The method of claim 1, wherein one of $R^2$ and $R^3$ is $-C(O)R^1$ and the other is a polyalkoxy group.

8. The method of claim 1, wherein the polyalkoxy group is a polyethoxy group comprising 2-60 moles of ethylene oxide.

9. The method of claim 1, wherein the fatty acid residue is a residue of lauric acid, oleic acid, stearic acid, palmitic acid, or a combination thereof.

10. The method of claim 1, wherein the formulation comprises more than one compound of formula (I) to form a mixture of compounds defined by formula (I).

11. The method of claim 10, wherein the mixture of compounds defined by formula (I) comprises ethoxylated $C_{8-22}$ mono- and diglycerides.

12. The method of claim 1, wherein the at least one propylene glycol ester of fat and/or a fatty acid is a combination of a monoester and a diester.

13. The method of claim 1, wherein the metal oxide is selected from the group consisting of silicon dioxide, titanium dioxide, zinc oxide, iron oxide, aluminum oxide, cerium oxide, zirconium oxide, and a combination thereof.

14. The method of claim 13, wherein the metal oxide is silicon dioxide.

15. The method of claim 1, wherein the formulation comprises
   (i) 25-70 wt % of at least one compound of formula (I),
   (ii) 25-74 wt % of at least one propylene glycol ester of fat and/or a fatty acid, and
   (iii) 1-5 wt % of a metal oxide,
wherein the amounts of (i), (ii), and (iii) add up to 100 wt % of the total formulation.

16. A formulation comprising (i) at least 20 wt % of a mixture of ethoxylated $C_{8-22}$ mono- and diglycerides, (ii) a liquid oil, and (iii) a metal oxide.

17. The formulation of claim 16, where in the metal oxide is silicon dioxide.

18. A formulation comprising (i) a mixture of ethoxylated $C_{8-22}$ mono- and diglycerides, (ii) at least one propylene glycol ester of fat and/or a fatty acid, and (iii) a metal oxide.

19. The formulation of claim 18, where in the metal oxide is silicon dioxide.

* * * * *